Patented Mar. 22, 1949

2,464,855

UNITED STATES PATENT OFFICE 2,464,855

VINYL RESIN COMPOSITION CONTAINING A STEARIC ACID AMIDE OF ETHYLENE DIAMINE

Fred W. Duggan, Bennington, Vt., and Robert P. Stambaugh, Bound Brook, N. J., assignors to Bakelite Corporation, a corporation of New Jersey No Drawing. Application October 26, 1944, Serial No. 560,526

1 Claim. (Cl. 260—32.6)

This invention relates to "block" resistant compositions comprising vinyl resins and will be described in connection with a resin which is a conjoint polymer of vinyl chloride with vinyl acetate.

It has heretofore been proposed to form articles, for instance sheets of coated fibrous bases, from or with resins of the above type, the sheets or coated fabrics being used as paulins and the like in extended sheet form or being further processed into articles such as hoods, rain coats and the like. The resins or their compositions are frequently molded, extruded, sheeted or applied to a base fabric by means or methods involving the use of heat; for example, the resins are sheeted or are calendered onto the bases by means of hot calendering rolls. In these cases the surfaces of the calendered films have a tendency to adhere or "block" if they are placed in contact in a heated condition; for instance, when the film comes from the calendering machine in a heated condition and is reeled into a bolt or roll, the resin surfaces have a tendency to adhere. Also, if finished articles, for instance paulins and rain coats, are packaged in bales for shipment and in such packaged condition are subjected to heat, for instance in the hold of a ship in which the bales are transported to equatorial latitudes, the resinous surfaces sometimes adhere or "block."

It is an object of the present invention to provide compositions comprising vinyl resins having improved anti-blocking characteristics to overcome the tendency of the compositions to adhere; and yet not otherwise materially change or impair the characteristics of the coating or composition.

We have found that compositions containing the vinyl resins, but with a greatly reduced blocking characteristic, can be obtained by the inclusion of a relatively small amount of a mono- or di-fatty acid amide of an alkylene diamine hereinafter, for brevity, sometimes referred to as a "fatty acid alkylene amide." These compounds are alkylene polyamines having terminal amino groups with an acyl group from a fatty acid substituted for one of the hydrogens on one or both of the terminal amino groups; they are of the general formula $R^1$—HN—R—NH—$R^2$ where R is an alkylene radical, for instance methylene, ethylene or propylene; $R^1$ is an acyl group from a saturated fatty acid having from 14 to 30, inclusive, carbon atoms in the chain, for instance the stearyl group from stearic acid; and $R^2$ is either hydrogen or an acyl group from a fatty acid having up to 30 carbon atoms in the chain. If $R^2$ is not hydrogen it is preferably the same acyl group as $R^1$ or has from 14 to 30, inclusive, carbon atoms in the chain but it may have less than 14 carbon atoms. When $R^2$ is hydrogen the compound is a mono-fatty acid alkylene amide amine and where $R^2$ is an acyl group from a fatty acid the compound is a di-fatty acid alkylene diamide. The anti-block materials can be incorporated into substantially any composition comprising a vinyl resin without materially changing the characteristics of the resin composition except in its blocking characteristics.

A complete and uniform distribution of the anti-block material throughout the resinous mass is desirable, and can be accomplished in any manner, for instance by mechanically mixing the anti-block material with the vinyl resin through a hot rolling or kneading operation; or by dispersing the amide in hot plasticizer and then blending the mixture with the resin and other ingredients. In these methods the amide is preferably dispersed in the liquid (melted) form and may be added in solid or liquid form to any of the other ingredients which are, or which thereafter may be, heated sufficiently to melt the amide. Preferably the melted amide is incorporated into at least one of the other ingredients which is hot enough to keep the amide melted until thorough mixing of the ingredients and dispersion of the amide is effected. When well compounded, only very small amounts of the anti-block materials are required to impart readily apparent improvement in the anti-block properties of the resin or composition including it, and quantities of the preferred anti-block material even as low as 1% on the weight of the composition will lower substantially to zero the force necessary to pull apart contacting surfaces of the compositions comprising the vinyl resins and anti-block materials.

A mono- or di-stearic acid amide of ethylene diamine, hereinafter sometimes referred to as a "stearyl ethylene amide," is representative of the fatty acid alkylene amide anti-block agents which produce the results described. Mono- and di-stearyl ethylene amides produce the results described and the monostearyl and distearyl compounds may be used in admixture with each other.

The stearyl ethylene amide compound used need not be chemically pure. Commercial compounds may be used. The nitrogen content of materials used ranged from 5.8 to 7.0%, whereas the theoretical nitrogen content of the distearyl ethylene diamide would range from 4.5 to 4.8%, depending upon the amount of water split out during preparation. Data on a commercial product and a laboratory product are:

|  | Acid No. | Per Cent $N_2$ | Melting Point |
|---|---|---|---|
|  |  |  | °C. |
| Commercial product | 7.8 | 7.0 | 128 |
| Laboratory stearyl ethylene amide | 4.0 | 5.8 | 135 |

These data indicate that the commercial product is a mixture of about 58% mono- and 38% di-stearyl ethylene amide, with about 4% of free stearic acid while the laboratory product is a mixture of about 30% mono- and 68% di-stearyl ethylene amide, with about 2% free stearic acid.

The anti-block effect of the various release materials was tested in the following manner:

A representative resinous base composition containing no anti-block material was prepared by mixing various ingredients according to a manipulative procedure which gave a homogeneous composition. Other resinous compositions containing the same ingredients in substantially the same proportions as the base composition, but including various amounts of different anti-block materials, were prepared by the same manipulative procedure. Films about 0.020 inch in thickness were formed from the several compositions. Two strips (1″ x 6″) were cut from each film, pressed face to face between glass plates under a pressure of 0.17 lb. per sq. in. (1 lb. total pressure for the 1″ x 6″ strip) for 30 minutes while heated to a temperature of 180° F. and then allowed to cool to room temperature (about 77° F.) while under the stated pressure. The glass plates were removed and the strips were tested for surface cohesion by pulling the strips apart on a Scott tensile tester. To make the test, the strips were separated by hand at a short edge and for a suitable distance (about ½ inch) back from the edge so that clamps could be put on the separated portions. The clamps, after gripping the respective strips, were fastened in the machine which was then operated to pull the strips apart. Indicating mechanism showed the force (cohesive force), in lbs. per in. width, necessary to pull apart the cohered surfaces of the strips. This test constitutes a rather severe evaluation of the surface release characteristics of the compositions tested.

All compositions tested were prepared by thoroughly mixing the ingredients in a kneader and then working the mixture on hot rolls until the composition was entirely homogeneous. Sheets 0.020 inch in thickness were drawn from the rolls after the composition was homogeneous and the strips for test were cut from the central portions of the sheets. At least four pairs of strips of each composition were tested.

As shown by the following examples and the results of tests, the previously described anti-block materials give unexpectedly good results as compared with somewhat similar materials containing three or more of the stearyl and amido groups. For example, tristearyl diethylene triamide is less than about one-third as effective, and tetrastearyl triethylene tetramide is about one-fourth as effective, as a mono- or di-stearyl ethylene amide. The anti-block property also appears to be exhibited in the unexpected manner only when the compound contains the alkylene group, as stearamide is only about one-fourth as effective as the mono- and di-stearyl ethylene amides. Stearic acid has some but only relatively little anti-blocking effect, and ethylene diamine has a blocking effect instead of an anti-blocking effect.

EXAMPLES OF COMPOSITIONS TESTED

Example 1

The following is the formula of a base composition containing no anti-block agent. The parts in this and the other examples are by weight.

|  | Parts |
|---|---|
| Vinyl resin | 56.09 |
| Plasticizer | 40.00 |
| Stabilizer | 2.00 |
| Lubricant | 1.00 |
| Color | .91 |
| Total | 100 |

Cohesive force (average lbs./in.) _____ 2.8

The vinyl resin was a conjoint polymer of vinyl chloride and vinyl acetate containing between about 88.5% and 91.5% by weight of combined vinyl chloride and having an average molecular weight of about 16,000, as determined by Staudinger's method from the viscosity of dilute solutions of the resin; its heat stability was such that it showed no blackening when heated for 135 minutes in an oil bath at 135° C. and it had a plastic temperature in the range from 167 to 171° C. (cf. Carbide and Carbon Chemicals Corporation Specifications–Sl-35-VYNS. 1-May 14, 1942 re "Vinylite" Resin-Grade VYNS-1). The plasticizer was di-2-ethylhexyl phthalate. The stabilizer was basic lead carbonate. The lubricant was a commercial product believed to be a blend of refined fatty acids, the analysis of which is said to be: fatty acids 55–60%, rosin acids (calculated as abietic) 34–38%, sterols—higher alcohols, etc. 6–10% (cf. "Indusoil" in The Condensed Chemical Dictionary, Third Edition, published by Reinhold Publishing Corp., 1942). The color was an olive drab pigment comprising a mixture of brown and red synthetic iron oxides, titanium dioxide, carbon black and chlorinated phthalo cyanine. The same materials are the basic ingredients in the following examples.

Examples 2–9

The following are formulae of the base composition modified to include the stated amounts of the stated anti-block agents.

| Example No. | 2 | 3 | 4 | 5 |
|---|---|---|---|---|
| Vinyl resin | 55.59 | 55.09 | 54.09 | 53.09 |
| Plasticizer | 40.00 | 40.00 | 40.00 | 40.00 |
| Stabilizer | 2.00 | 2.00 | 2.00 | 2.00 |
| Lubricant | 1.00 | 1.00 | 1.00 | 1.00 |
| Commercial stearyl ethylene amide as previously described | 0.50 | 1.00 | 2.00 | 3.00 |
| Color | 0.91 | 0.91 | 0.91 | 0.91 |
| Total | 100 | 100 | 100 | 100 |
| Cohesive force (average lbs./in.) | 0.7 | 0.3 | 0 | 0.2 |

| Example No. | 6 | 7 | 8 | 9 |
|---|---|---|---|---|
| Vinyl resin | 55.59 | 55.09 | 54.09 | 53.09 |
| Plasticizer | 40.00 | 40.00 | 40.00 | 40.00 |
| Stabilizer | 2.00 | 2.00 | 2.00 | 2.00 |
| Lubricant | 1.00 | 1.00 | 1.00 | 1.00 |
| Laboratory stearyl ethylene amide as previously described | 0.50 | 1.00 | 2.00 | 3.00 |
| Color | 0.91 | 0.91 | 0.91 | 0.91 |
| Total | 100 | 100 | 100 | 100 |
| Cohesive force (average lbs./in.) | 1.1 | 0.3 | 0.2 | 0 |

Examples 10–19

The following are formulae of test compositions including the stated amounts of the stated modifying agents which are not satisfactory anti-block agents although from their formulae, it would appear that they should act as anti-block agents.

| Example No. | 10 | 11 | 12 | 13 | 14 | 15 |
|---|---|---|---|---|---|---|
| Vinyl resin | 56.09 | 55.09 | 55.09 | 55.09 | 55.09 | 55.09 |
| Plasticizer | 40.00 | 40.00 | 40.00 | 40.00 | 40.00 | 40.00 |
| Stabilizer | 2.00 | 2.00 | 2.00 | 2.00 | 2.00 | 2.00 |
| Lubricant | | | | 1.00 | 1.00 | 1.00 |
| Stearic acid | 1.00 | 2.00 | 1.00 | | | |
| Ethylene diamine | | | | | 1.00 | |
| Tristearyl diethylene triamide | | | | | | 1.00 |
| Tetrastearyl triethylene tetramide | | | | | | 1.00 |
| Color | 0.91 | 0.91 | 0.91 | 0.91 | 0.91 | 0.91 |
| Total | 100 | 100 | 100 | 100 | 100 | 100 |
| Cohesive force (average lbs./in.) | 1.85 | 2.2 | 2.1 | 3.6 | 1.8 | 2.0 |

| Example No. | 16 | 17 | 18 | 19 |
|---|---|---|---|---|
| Vinyl resin | 55.09 | 55.09 | 55.09 | 55.09 |
| Plasticizer | 40.00 | 40.00 | 40.00 | 40.00 |
| Stabilizer | 2.00 | 2.00 | 2.00 | 2.00 |
| Lubricant | 1.00 | 1.00 | 1.00 | 1.00 |
| Stearic anhydride | 1.00 | | | |
| Stearamide | | 1.00 | | |
| Calcium stearate | | | 1.00 | |
| Lead stearate | | | | 1.00 |
| Color | 0.91 | 0.91 | 0.91 | 0.91 |
| Total | 100 | 100 | 100 | 100 |
| Cohesive force (average lbs./in.) | 2.5 | 2.0 | 2.5 | 1.5 |

The purpose of the tests shown in Examples 10, 11, and 12 was to determine whether the anti-block effect could be attributed merely to a lubricating effect (stearic acid being a lubricant) and the purpose of the tests shown in Examples 12 and 13 was to determine whether the anti-block effect could be attributed to either the fatty acid or the ethylene diamine.

It is to be understood that the foregoing Examples 2 to 9, inclusive, are merely illustrative of many compositions which may be made within the broader scope of the invention. The previously indicated amides may be used in combination with or instead of the stearyl ethylene amides.

The amides used are wax-like materials, incompatible with the straight vinyl chloride resins but somewhat compatible with the vinyl acetate resins and of intermediate compatibility with the vinyl chloride-vinyl acetate copolymer resins depending upon the relative amounts of the chloride and acetate in the resin. The melting points of the anti-block materials should be above 50° C. and below 160° C. and the materials are substantially insoluble in water.

The anti-block materials exhibit their anti-blocking characteristic most pronouncedly with the relatively flexible or soft compositions, that is compositions which have Durometer hardness values between 20 and 90 at 25° C. (room temperature) on the A scale (A. S. T. M. test No. D–676–42T) or stiffness values between 150 and 5000 psi (at room temperature) by the Olsen stiffness tester (A. S. T. M. test No. D–747–43T). The relatively soft and flexible compositions can be obtained either by using a relatively soft vinyl resin with less plasticizer or a relatively harder vinyl resin with more plasticizer. Suitable conjoint polymer vinyl resins are those prepared by copolymerizing a monovinyl monomeric inorganic ester, for instance a vinyl halide as vinyl chloride or vinyl bromide, with a monovinyl monomeric organic ester, for instance the vinyl ester of formic acid, or acetic acid, propionic acid, butyric acid, valeric acid or caproic acid. In these cases the vinyl halide (which is usually and preferably vinyl chloride) is the predominant vinyl compound used in forming the resin and appearing in the resin. Especially considered herein as suitable resins are those made by the conjoint polymerization of vinyl chloride with vinyl acetate having a vinyl chloride content in the polymer of from about 75% to 98% by weight and an average molecular weight of about 5,000 to 30,000. Of this range, resins having from 85% to 97% combined vinyl chloride and an average molecular weight from about 10,000 to 24,000 (as determined by the Staudinger viscosity method) are preferred. The resins having the higher average molecular weights and the higher halide content are harder and have less tacky surfaces than those of lower average molecular weight and lower halide content, and hence the effect of the anti-block material, although present, is less appreciated in the harder resins and harder compositions than in the softer resins and softer compositions. With vinyl resins having more than 98% combined vinyl halide and average molecular weights higher than 15,000, the noticeable effect of the anti-block material tapers off quite sharply as the resins are quite hard and if little or a normal amount of plasticizer is used, the composition is so hard that the effect of the anti-block material is obscured while if an excess of plasticizing material is used to obtain a flexible composition, the plasticizer obscures the effect of the anti-block material.

Instead of a conjoint polymer of vinyl chloride or bromide with vinyl acetate, conjoint polymers of these halides with other materials may be used. Also the base resin may be of the straight polyvinyl inorganic ester type, for instance polyvinyl chloride. The usual compositions comprising straight polyvinyl chloride resin and the usual amount of a plasticizer which gives a dry surface have little need for anti-block agents because the 100% polyvinyl chloride resin provides a surface which is not tacky. However, if a plasticizer or other ingredient is used in the composition which renders the surface tacky, a small amount of an anti-block agent disclosed herein, say up to about 2% by weight on the weight of the resin, may be desirable.

The resins previously described are entirely of or contain a major proportion of, combined vinyl halide, that is they are predominantly combined vinyl halide. The anti-block effect of the anti-block materials, although present, appears to be somewhat counteracted and obscured by the presence of too large a proportion of either a purely organic ester or plasticizer. Thus, the vinyl resins previously described as suitable are to be distinguished from such resins as polyvinyl alcohol butyraldehyde resins, pure polyvinyl acetate resins, the diene resins and similar resins. The anti-block effect is so obscured where the composition contains an average amount, say from about 30 to 35% by weight of a usual plasticizer, for instance di-2-ethylhexyl phthalate, and from about 65 to 70% of a resin containing more than 25% vinyl organic ester or where the composition contains more than 60% organic plasticizer and the resin contains less than 25% vinyl organic ester, that the anti-block material would not ordinarily be used in compositions containing resins with higher amounts of vinyl inorganic esters or higher amounts of plasticizer. Thus the effect of the anti-block agents is most pronounced when used with vinyl resins containing not more than 25% vinyl organic ester (although the resins preferably contain a minimum of about 2% of a vinyl organic ester) in compositions containing effective amounts but not more than 60% of plasticizer.

The anti-block effect apparently reaches its maximum in the case of vinyl resins (whether sole or joint polymers) containing vinyl halide and having a softness corresponding to the resin in Example 1. Where the composition has a softness or a flexibility corresponding to that of the composition of Example 1, (or the hardness and stiffness values previously given) a maximum of about 3% by weight of the anti-block material, based on the combined weight of resin and plasticizer, reduces the cohesive force substantially to zero.

It is to be understood that the said anti-block materials may be used in combination with other materials than the lubricant used in the examples, which are recognized in the art as lubricants and which are used to prevent sticking of compositions comprising vinyl resins to molds or the surfaces or nozzles of extrusion apparatus; but it was found, as previously shown, that the so-called lubricants do not have the effect of the anti-blocking materials in producing the anti-blocking action, as distinguished from a distinctly lubricating action, that is permitting the material to move easily over a metal surface such as is used in a molding or extrusion apparatus.

It is also to be understood that, as indicated in the foregoing examples, pigments or other coloring materials, fillers, plasticizers, and other modifying agents commonly employed in vinyl resin compositions may be incorporated along with the anti-block materials and no limitations in this respect are intended, the invention being directed primarily to the discovery that the said anti-block materials have been found to be so unexpectedly efficient in their anti-blocking action, as such small amounts thereof can be used, that a vinyl resin composition with excellent anti-blocking characteristics can be obtained by the use of these anti-blocking materials without substantial change in the other desirable characteristics of the compositions.

In all of the tests made with the vinyl resin compositions containing the anti-block materials contemplated herein, no deleterious effect is evidenced by the presence of said material, in the properties of the resin composition such as light stability, water absorption and other characteristics important to the compositions. The anti-block materials are substantially colorless and do not discolor the composition, nor do they interfere with standard colors used in the compositions. Although the anti-block materials are not used primarily for the purpose of lubricating the compositions with respect to metal molds or dies or milling rolls, it has been found that they have advantages in this respect in that they act as lubricants; and compositions including them have less tendency to stick in the mold or in injection nozzles or in contact with the calendering rolls.

A further advantage of the previously described anti-block materials is that after being dispersed in the resins they remain dispersed therein and there is no excessive sweat-out of the anti-block material as the composition ages.

The modifying materials, although normally solid at room or atmospheric temperatures of from about 10° to 40° C., are plastic or melt at temperatures below 160° C. at which temperatures compositions of the vinyl resins are frequently compounded on the hot rolls. However, even at the temperatures at which the anti-block materials are fluid, they have very low vapor pressures and have little tendency to evaporate when being incorporated with the resin. The anti-block materials do not react chemically with the vinyl resins. The amount of the anti-block agent used, and the type thereof within the limits heretofore given, is correlated with the other ingredients of the composition and the amounts thereof, principally with the resin, to the end that the composition contains minute, microscopic and preferably colloidal particles of the anti-block agent which are free and undissolved in the composition, that is the amount of anti-block agent is preferably such as to give mobile particles thereof which amount is greater than the amount necessary to saturate the composition. But the amount of anti-block agent is preferably only in such slight excess of the quantity necessary to saturate the composition as is effective in imparting the anti-block characteristic; too much anti-block agent may degrade the physical properties of the composition. The anti-block materials do not show a whiteness when subjected to water as do the fatty acids, for instance stearic acid. Also the anti-block materials exhibit no tendency either to harden or to soften the resins, at least in the amounts and to the extent used to give the compositions the anti-block characteristics, or otherwise to deteriorate the characteristics of the resins or their compositions.

The anti-block modifying materials contemplated herein are also particularly advantageous for use with the vinyl resins as both the modifying materials and the resins are substantially insoluble in water and alcohol. The compositions comprising the resins and the anti-block materials can be used wherever the anti-block characteristics are desired and the resin compositions without the anti-block materials could be used, for instance in molding compositions, lacquers, sheetings, films, coatings and impregnants for paper, cloth and all types of textiles.

The invention is susceptible of modification within the scope of the appended claim.

What is claimed is:

Resinous composition comprising a polyvinyl resin of a molecular weight between about 10,000 and 24,000, which is a copolymer of vinyl chloride and vinyl acetate containing between about 85% and 97% by weight of combined vinyl chloride, a plasticizer for the resin in an amount sufficient to plasticize the resin but in an amount no more than 60 parts by weight of plasticizer per 100 parts by weight of total composition, and from an effective amount up to about 3% by weight based on the combined weight of the resin and plasticizer of an anti-block agent comprising a stearic acid amide of ethylene diamine.

FRED W. DUGGAN.
ROBERT P. STAMBAUGH.

REFERENCES CITED

The following references are of record in the file of this patent:

UNITED STATES PATENTS

| Number | Name | Date |
|---|---|---|
| 2,098,538 | Charch | Nov. 9, 1937 |
| 2,132,388 | Berchet | Oct. 11, 1938 |
| 2,267,685 | Kyrides | Dec. 23, 1941 |
| 2,339,056 | Craver | Jan. 11, 1944 |
| 2,380,925 | Cheyney | Aug. 7, 1945 |